(12) United States Patent
Hamming et al.

(10) Patent No.: US 6,378,796 B1
(45) Date of Patent: Apr. 30, 2002

(54) APPARATUS AND METHOD FOR DE-COUPLING GRABBER FROM TAKE-UP REEL

(75) Inventors: John Anthony Hamming, Laguna Niguel; Robert Ralph Heinze, San Clemente, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/679,879

(22) Filed: Oct. 5, 2000

Related U.S. Application Data
(60) Provisional application No. 60/158,605, filed on Oct. 8, 1999.

(51) Int. Cl.[7] .................................................. G03B 1/58
(52) U.S. Cl. ............................ 242/332.4; 242/332.1; 360/95
(58) Field of Search ....................... 242/332.4, 332.8, 242/332.7, 532.1, 532.6, 532.7, 582, 352.4, 338, 339, 337; 360/93, 96.5, 99.02, 99.03, 95

(56) References Cited

U.S. PATENT DOCUMENTS

| 4,335,858 | A | * | 6/1982 | Cranna | 242/332.4 |
|---|---|---|---|---|---|
| 4,426,047 | A | * | 1/1984 | Richard et al. | 242/332.4 |
| 4,608,614 | A | * | 8/1986 | Rinkleib et al. | 360/95 |
| 4,679,747 | A | * | 7/1987 | Smith | 242/332.4 |
| 4,704,645 | A | * | 11/1987 | Murphy et al. | 360/95 |
| 4,742,407 | A | * | 5/1988 | Smith et al. | 360/95 |
| 4,828,201 | A | * | 5/1989 | Smith | 360/95 X |
| 4,832,284 | A | * | 5/1989 | Inoue | 360/95 X |
| 4,852,825 | A | * | 8/1989 | McGee et al. | 242/332.4 |
| 5,219,129 | A | * | 6/1993 | Spicer et al. | 360/95 X |
| 6,034,839 | A | | 3/2000 | Hamming | |

* cited by examiner

Primary Examiner—William A. Rivera
(74) Attorney, Agent, or Firm—McDermott, Will & Emery

(57) ABSTRACT

A method of loading a tape from a single reel tape cartridge into a take-up reel. A guide arm decouples from a hub filler as the hub filler is moved into a take-up reel. This decoupling eliminates problems that occur from small misalignments of the hub filler axle with the axis of the take-up reel. The axle and drive arm are decoupled from the hub filler by the axle being lifted out of the hub filler upon insertion of the hub filler into the take-up reel, allowing for the take-up reel to rotate freely during winding and unwinding of the tape without interference from the axle.

21 Claims, 12 Drawing Sheets

APPARATUS AND METHOD FOR DE-COUPLING GRABBER FROM TAKE-UP REEL

RELATED APPLICATIONS

This application claims priority from U.S. Provisional Application Ser. No. 60/158,605, filed Oct. 8, 1999, incorporated herein by reference.

FIELD OF THE INVENTION

The present invention relates to a method and apparatus for decoupling a hub filler from a guide arm that drives the hub filler from a single reel tape cartridge to a take-up reel of a tape drive.

DESCRIPTION OF RELATED ART

Single reel tape cartridges are used to transport and store tape for reel-to-reel tape drives. A single reel tape cartridge is inserted into a tape drive and a mechanism is used to load the end of the tape into a take-up reel from the tape cartridge. Once the end of the tape is loaded into the take-up reel, the tape drive operates as a reel-to-reel tape drive. A motor is coupled to the take-up reel to rotate the take-up reel about the take-up reel axis and another motor is coupled to the single reel tape cartridge to rotate the reel of the tape cartridge about its axis.

The tape drive loading mechanism attaches to a tape leader pin, located at the end of the tape contained in the single reel tape cartridge. The hub filler uses a slot in the hub filler for receiving the tape leader pin. The hub filler is coupled to a guide arm that drives the hub filler between the single reel tape cartridge and the take-up reel. An example of a mechanism for driving the hub filler between the tape cartridge and the take-up reel is disclosed in U.S. Pat. No. 6,034,839.

FIG. 1 is a view of the tape drive loading mechanism disclosed in U.S. Pat. No. 6,034,839. The hub filler 300 enters into the cartridge 210 and attaches to the end of the tape. The hub filler 300 then moves along a guide rail 247, driven by the guide arm 250. Typically, the hub filler 300 attaches to the end of a tape in the tape cartridge 210 and the guide arm 250 moves the hub filler 300 along the guide rail 247, trailing the tape across the read/write head 222 and into the take-up reel 242. The hub filler 300 enters the take-up reel 245 through a channel 244 and into the hub 245 of the take-up reel 242.

FIG. 2 is a top view of the tape drive, depicting the hub filler 300 in the take-up reel 242 with the tape 216 attached. The tape 216 passes across the read/write head 222 and the end of the tape 216 is secured to the take-up reel 242. The tape drive is then operated by rotation of the take-up reel 242 and the single reel of the cartridge 210 about their respective axes to move the tape 216 across the read/write head 222. Motors are used to rotate the take-up reel 242 and the single reel of the cartridge 210, controlling the speed of the tape 216 as it moves across the read/write head 222. The hub filler 300 pivots on an axle 252 that is coupled to the guide arm 250. This pivoting is necessary for the hub filler 300 to be guided on the guide rail 247 into the take-up reel 242. Once the hub filler 300 is in the take-up reel 242, with the tape 216 attached, the take-up reel 242 rotates to thereby unload the tape from the cartridge 210. The hub filler 300 rotates with the take-up reel 242 on the axle 252. The loading mechanism attempts to align the axle 252 axis and the take-up reel 242 axis perfectly.

There are some concerns regarding the conventional tape drive loading mechanism described above. Perfectly aligning the hub filler's axle axis and the take-up reel axis is very difficult to do, due to mechanical tolerances. Misalignment can cause minor imbalances during rotation of the take-up reel; these minor imbalances can create small speed variations in the tape wind and unwind speeds. These variations in speed are difficult for the motors of the take-up reel and cartridge reel to compensate for. Hence, the variations in speed deter from the quality of the reading and writing of the tape at the read/write head. Additionally, misalignment of the hub filler axis and the take-up reel axis reduce the life of the bearings in the take-up reel. Worn bearings will produce vibrations and result in noise during recording and reading at the read/write head.

SUMMARY OF THE INVENTION

There is a need for a tape drive loading mechanism that can effectively load the end of a tape from a single reel tape cartridge to a take-up reel without the vibrations or variations of the rotation speed at the take-up reel.

These and other needs are met by embodiments of the present invention, which provide a method of de-coupling a hub filler from a guide arm. The present invention eliminates the need for the take-up reel axis and the hub filler axis to be precisely aligned when the hub filler attaches to the take-up reel. The tape loading mechanism of the present invention de-couples the hub filler from the guide arm as the hub filler enters the take-up reel. As the hub filler rotates with the take-up reel, during reading and writing of a tape, the hub filler is not restrained by the axle coupled to the guide arm.

There are several advantages of the present invention. The present invention eliminates the need for the hub filler axis and the take-up reel axis to be precisely aligned as the hub filler attaches to the take-up reel. The present invention eliminates minor imbalances during rotation of the take-up reel that create small speed variations in the tape wind and unwind speeds, resulting from the misalignment of the hub filler axis and the take-up reel axis. Another advantage of the present invention is that the bearings are not damaged due to the misalignment of the hub filler axis and the take-up reel axis. Worn bearings produce vibrations that cause noise in the read/write head during reading and writing of the tape. Yet another advantage of the present invention is that the hub filler can de-couple from the guide arm and still maintain the spring-loaded characteristic during leader pin attachment and during travel between the cartridge and the take-up reel. The above-listed advantages are examples, and not exclusive.

The foregoing and other features, aspects, and advantages of the present invention will become more apparent from the following detailed description of the present invention, taken in conjunction with the accompanying drawings.

DETAILED DESCRIPTION OF THE INVENTION

The present invention relates to an apparatus for loading a take-up reel with tape from a single reel tape cartridge. The cartridge of the present invention is a single reel cartridge and it is necessary for the tape drive to load the end of the tape from the cartridge to the take-up reel. A hub filler, which is part of the tape drive, receives the end of the tape from the cartridge. After the hub filler has attached to the end of the tape in the cartridge, usually by attaching to a leader pin that is connected to the end of the tape, the hub filler moves along a guide rail pulling the tape out of the cartridge, across the read/write head, and to the take-up reel. The hub filler enters the take-up reel, with the tape attached, and brings the hub filler to the hub of the take-up reel. Upon the hub filler attaching to the take-up reel, the tape is connected to both the single reel of the cartridge and the take-up reel. The rotation of the two reels controls the movement of the tape across the read/write head and consequently, the reading of the tape. A guide arm moves the hub filler from the cartridge to the take-up reel. The hub filler pivots on an axle as it is driven by the guide arm. As the hub filler enters the take-up reel, the axle de-couples from the hub filler.

Figure 1:
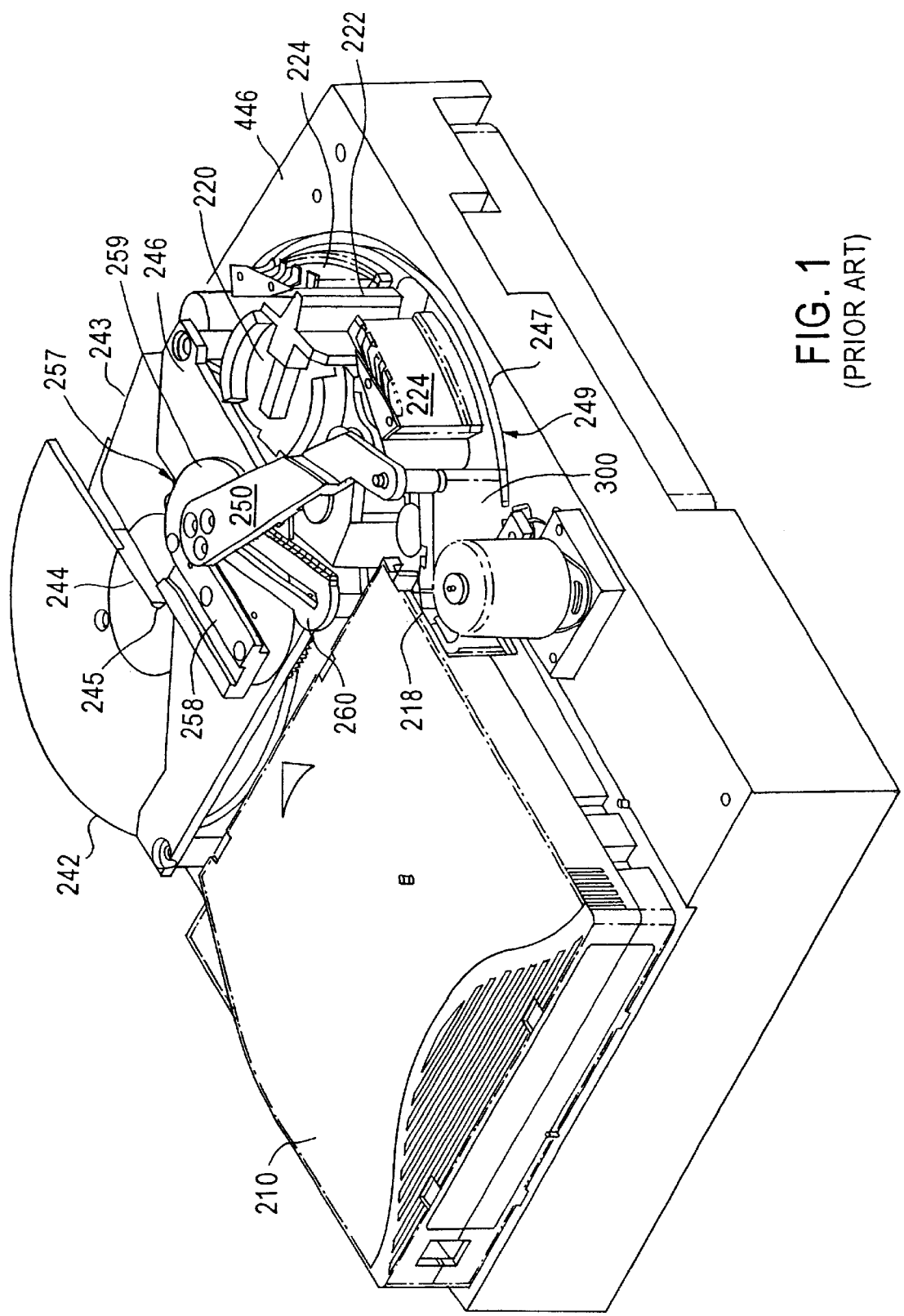
FIG. 1 is a view of a prior art tape drive loading mechanism.
Figure 2:
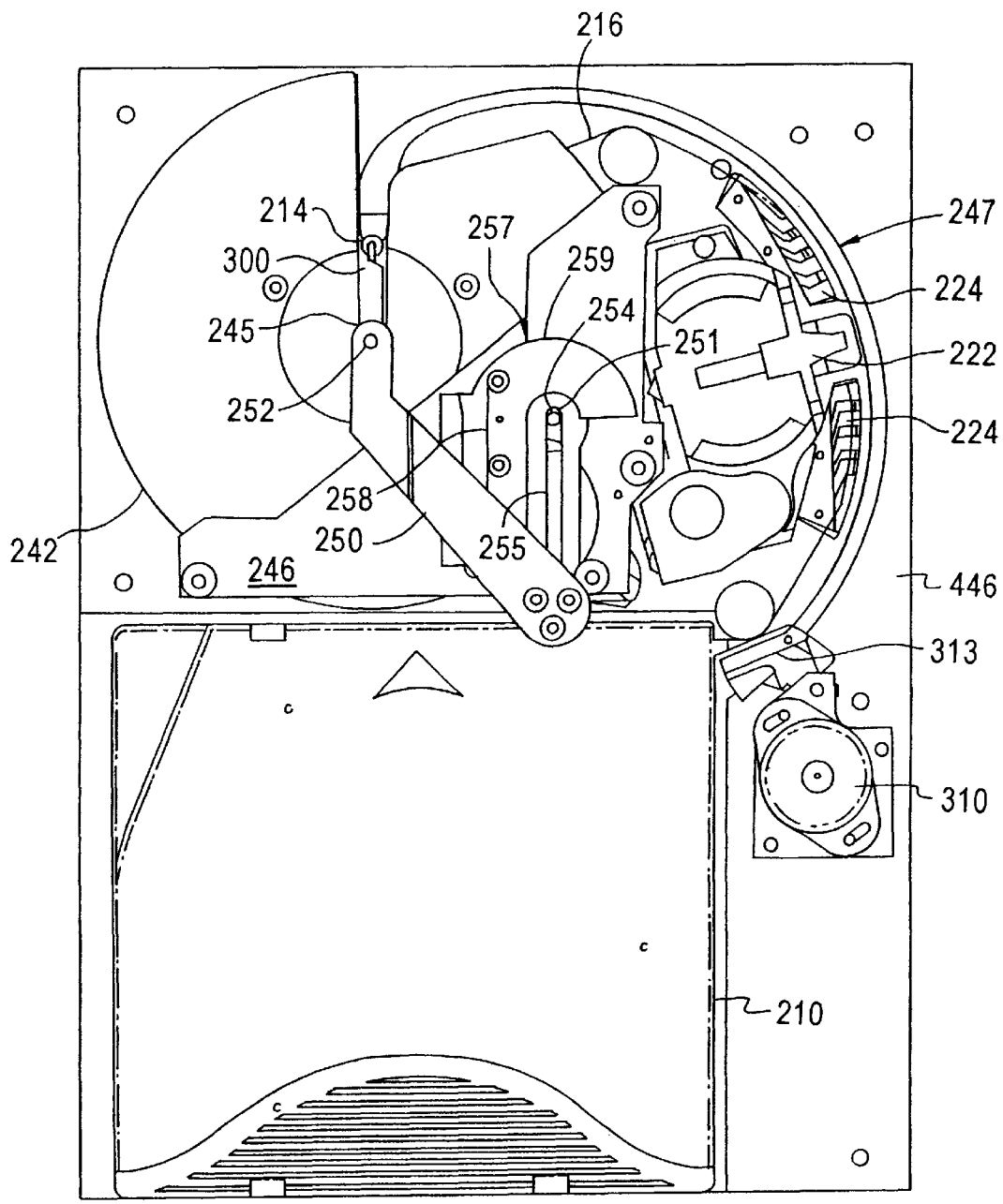
FIG. 2 is a top view of the prior art tape drive loading mechanism.
Figure 3:
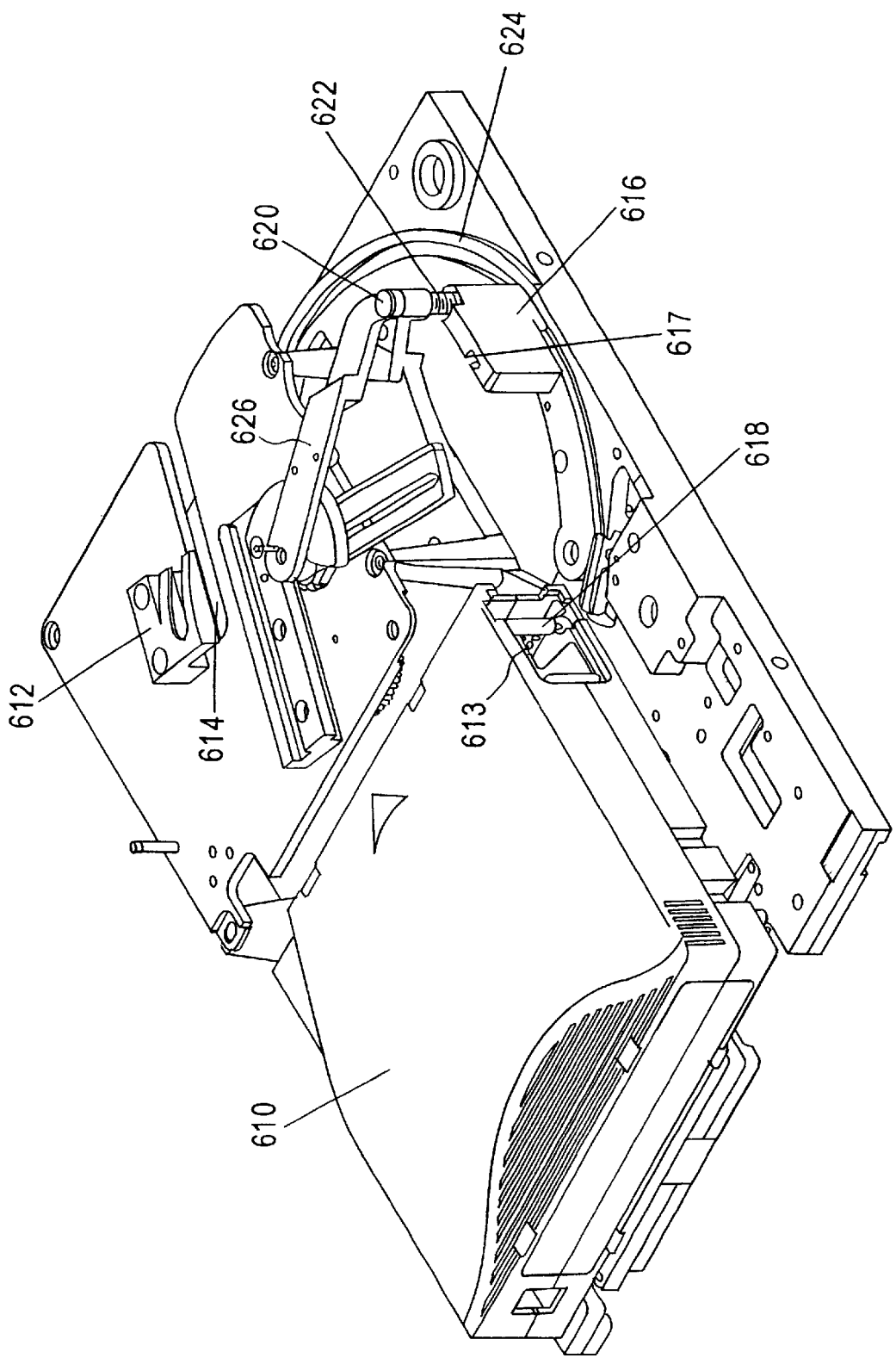
FIG. 3 is a view of the tape drive loading mechanism of the present invention.

FIG. 3 is a view of the tape drive loading mechanism of the present invention. A single reel tape cartridge 610 is positioned in the tape drive. The tape 613 is wound on a reel inside the cartridge 610 and the end of the tape 613 is attached to a leader pin 618. A hub filler 616 moves along a guide rail 624, driven by a guide arm 626, from the cartridge 610 to a take-up reel 614. The hub filler 616 pivots on an axle 620. The hub filler 616 is held to the guide rail 624 by pressure from a spring 622 as the hub filler 616 moves along the guide rail 624 to and from the tape cartridge 610 and the take-up reel 614. The hub filler 616 also includes a catcher 617 that attaches to the leader pin 618 when entering the cartridge 610. As the hub filler 616 enters the take-up reel 614, the axle 620 is lifted from the hub filler 616 by a ramp 612.

Other mechanisms can be used to de-couple the axle 620 from the hub filler 616 within the scope of the invention. For example, one embodiment that may be used to de-couple the axle 620 from the hub filler 616 is a spring mechanism that manipulates spring tensions at the take-up reel 614 to lift the axle 620 out of the hub filler 616. Other embodiments include a snap coupling arrangement, and a latch and release arrangement. Still another embodiment that may be used to de-couple the axle 620 is a motor lifting the axle 620 out of the hub filler 616. The above-described embodiments for lifting the axle 620 out of the hub filler 616 are not exclusive.

Figure 4:
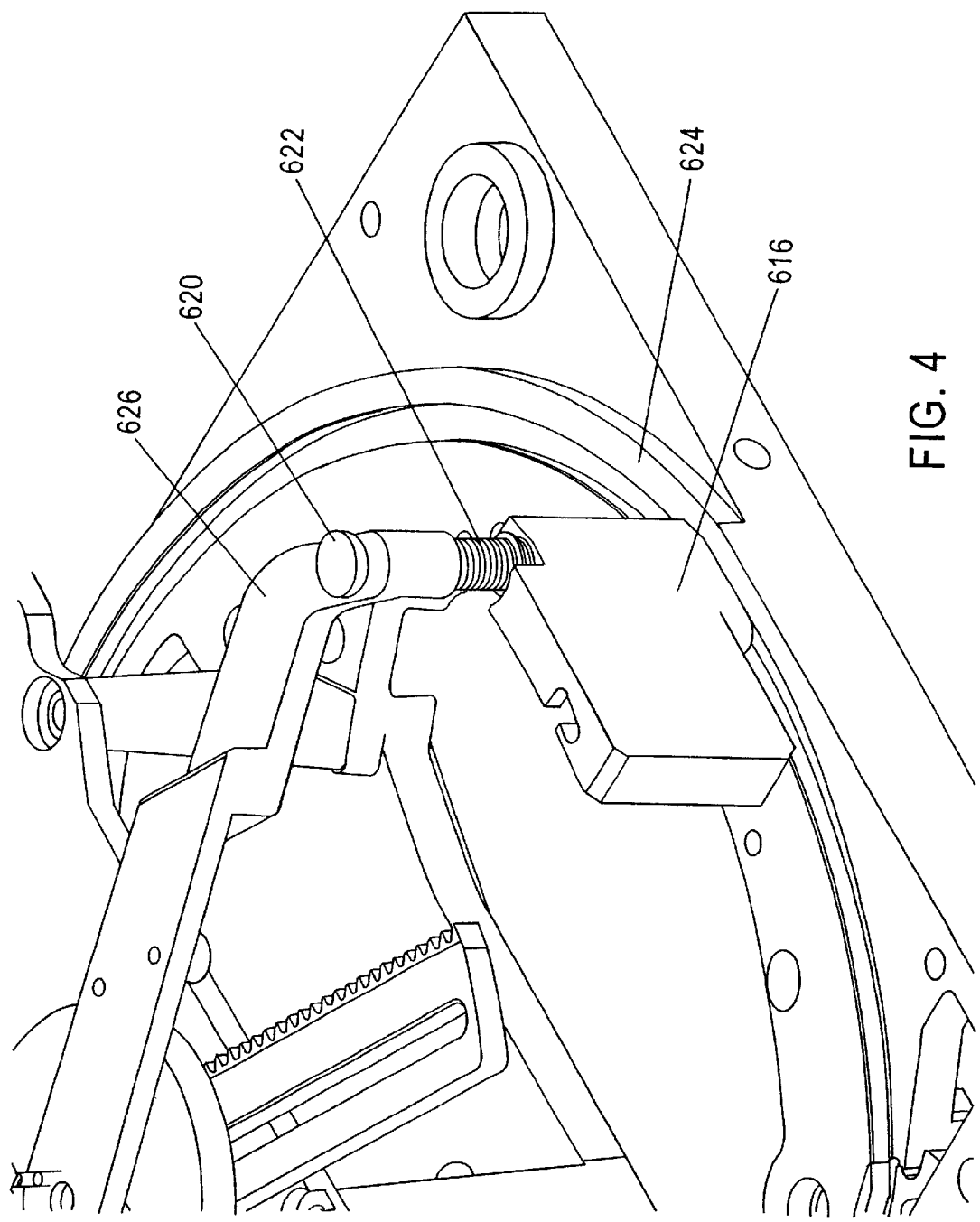
FIG. 4 is a view of the hub filler on the guide rail.

FIG. 4 is a view of the hub filler 616 on the guide rail 624 between the tape cartridge 610 and the take-up reel 614. The hub filler 616 is held to the guide rail 624 by the spring 622 disposed around the axle, creating tension between the hub filler 616 and the guide arm 626. The axle 620 can move in the vertical direction and rotates in a bore of the guide arm 626. The top of the axle 620 has a portion that is larger than the bore of the guide arm 626. The guide arm 626 moves in a horizontal plane during travel between the cartridge 610 and the take-up reel 614. The spring 622 between the guide arm 626 and the hub filler 616 exerts downward pressure (as viewed in FIG. 4) on the hub filler 616, pressing the hub filler 616 against the guide rail 624. This ensures that the hub filler 616 stays on the guide rail 624 during travel from the cartridge 610 to the take-up reel 614. The spring 622 is attached to a notch in the axle 620 and pushes the axle 620 into the hub filler 616. When the axle 620 is pulled out of the hub filler 616, the tension of the spring 622 is increased.

Figure 5:
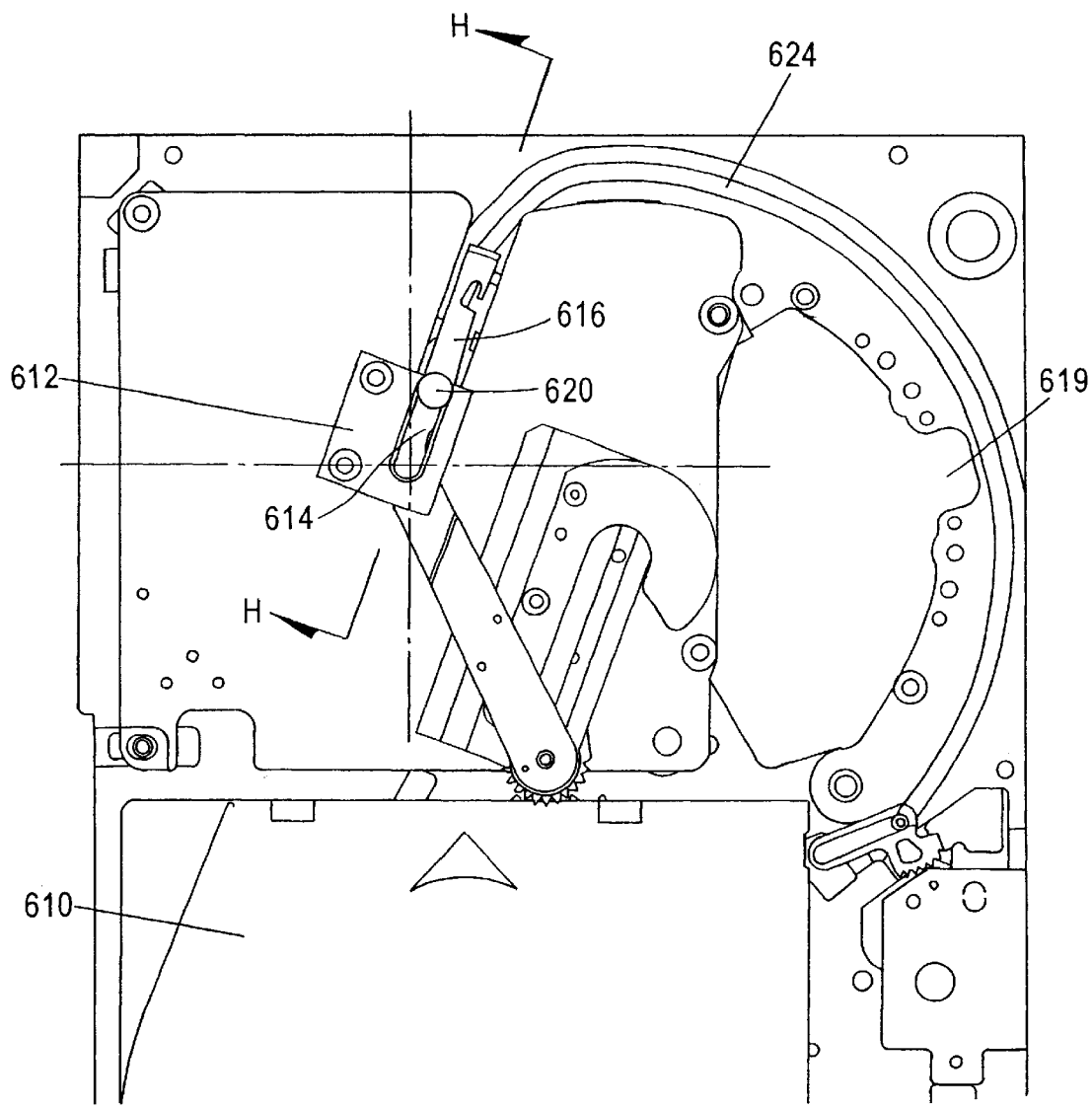
FIG. 5 is a top view of the tape drive loading mechanism of the present invention.

FIG. 5 is a top view of the tape drive loading mechanism. The single reel tape cartridge 610 is shown inserted in the tape drive. The hub filler 616 is shown entering the take-up reel 614, but not fully inserted. The axle 620 is shown at the entering position of the ramp 612. The hub filler 616 travels from the cartridge 610 to the take-up reel 614 along the guide rail 624, pulling tape from the cartridge 610 across a read/write head 619.

Figure 6:
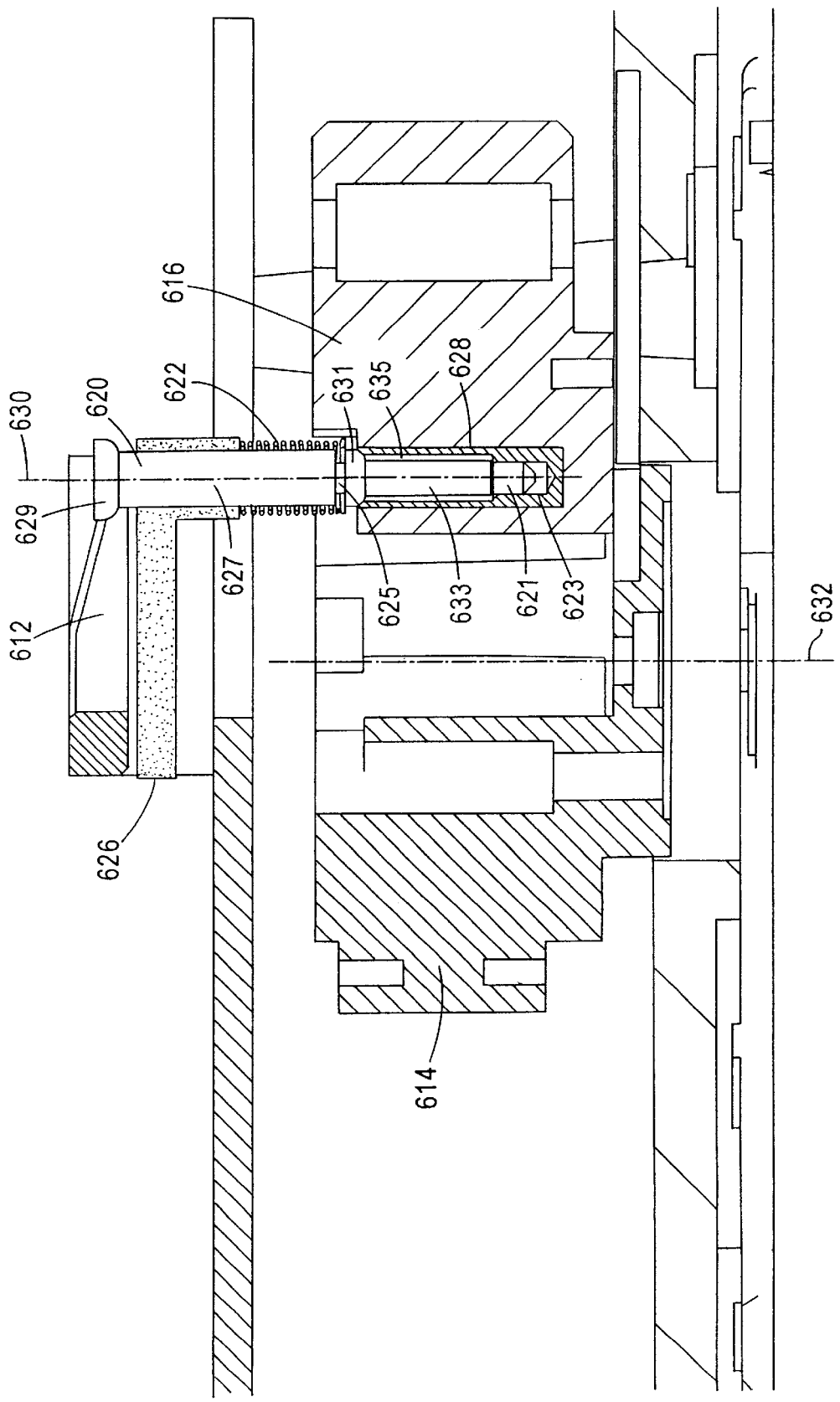
FIG. 6 is a side view of the hub filler entering the take-up reel.

FIG. 6 is a side view of the hub filler 616 entering the take-up reel 614. The side view of the hub filler 616 shows the axle 620 in a sheath 628 of the hub filler 616. Since the sheath 628 and the axle 620 are cylindrical, the hub filler 616 is able to pivot about the axle 620 as the hub filler 616 moves along the bends of the guide rail 624. A small shaft 621 of the axle 620 and a small bore 623 of the sheath 628 fit snugly together, such that the hub filler 616 pivots about the axle 620 and is tightly controlled by the movement of the guide arm 626. The spring 622 is attached to the axle 620 at a notch 625 in the axle 620. The other end of the spring 622 presses against the guide arm 626, creating tension and pushing the axle 620 into the sheath 628 of the hub filler 616. The axle axis 630 is the axis about which the hub filler 616 pivots during travel along the guide rail 624.

As will be explained in more detail with respect to FIGS. 7–9, the axle 620 is de-coupled from the hub filler 616 by the ramp 612, so that the hub filler 616 can rotate freely on the axis of the take-up reel 614 during winding and unwinding of the tape. The large shaft 627 of the axle 620 is rotatable inside the bore 613 of the guide arm 626. Above the large shaft 627 of the axle 620 is a top section 629 of the axle 620. As the hub filler 616 enters the take-up reel 614, the axle top section 629 contacts the ramp 612 and the axle 620 is lifted out of the hub filler 616. When the hub filler 616 is not in the take-up reel 614, the axle 620 is in the hub filler 616 and the hub filler 616 is tightly pivoting on the axle 620. A small spherical stop 631 interacts with the top of a large bore 635 to limit movement of the axle 620 into the sheath 628.

Figure 7:
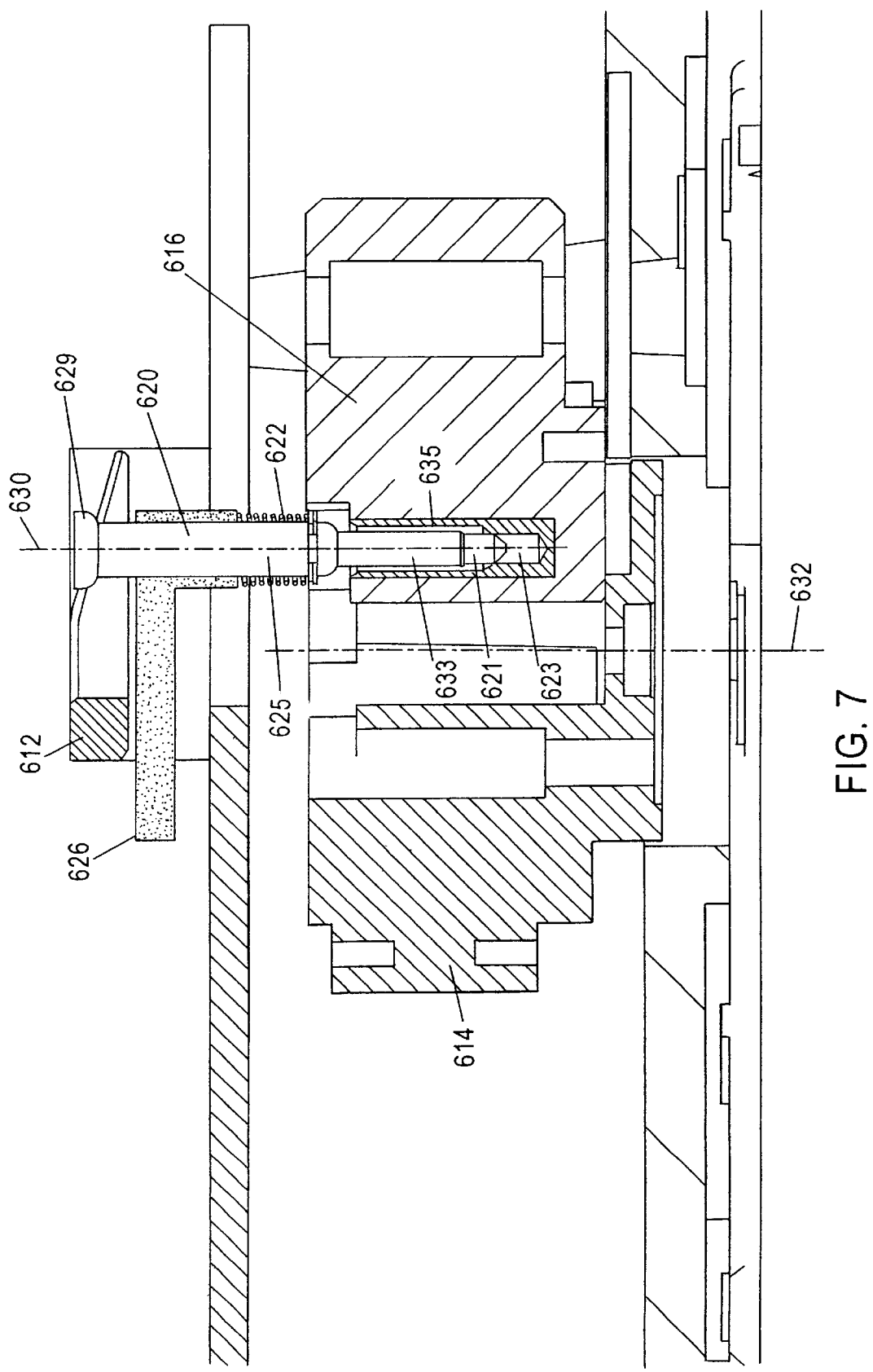
FIG. 7 is a side view of the hub filler entering the take-up reel and decoupling from the guide arm.

FIG. 7 is a side view of the hub filler 616 entering the take-up reel 614. The axle top section 629 and the axle 620 are lifted up the ramp 612 as the hub filler 616 moves into the take-up reel 614 driven by the guide arm 626. This causes the axle 620 to partially lift out of the hub filler 616. The small shaft 621 is almost, but not completely, removed from the small bore 623. The axis 630 of the axle 620 is now closer to the axis 632 of take-up reel 614 than shown in FIG. 6.

Figure 8:
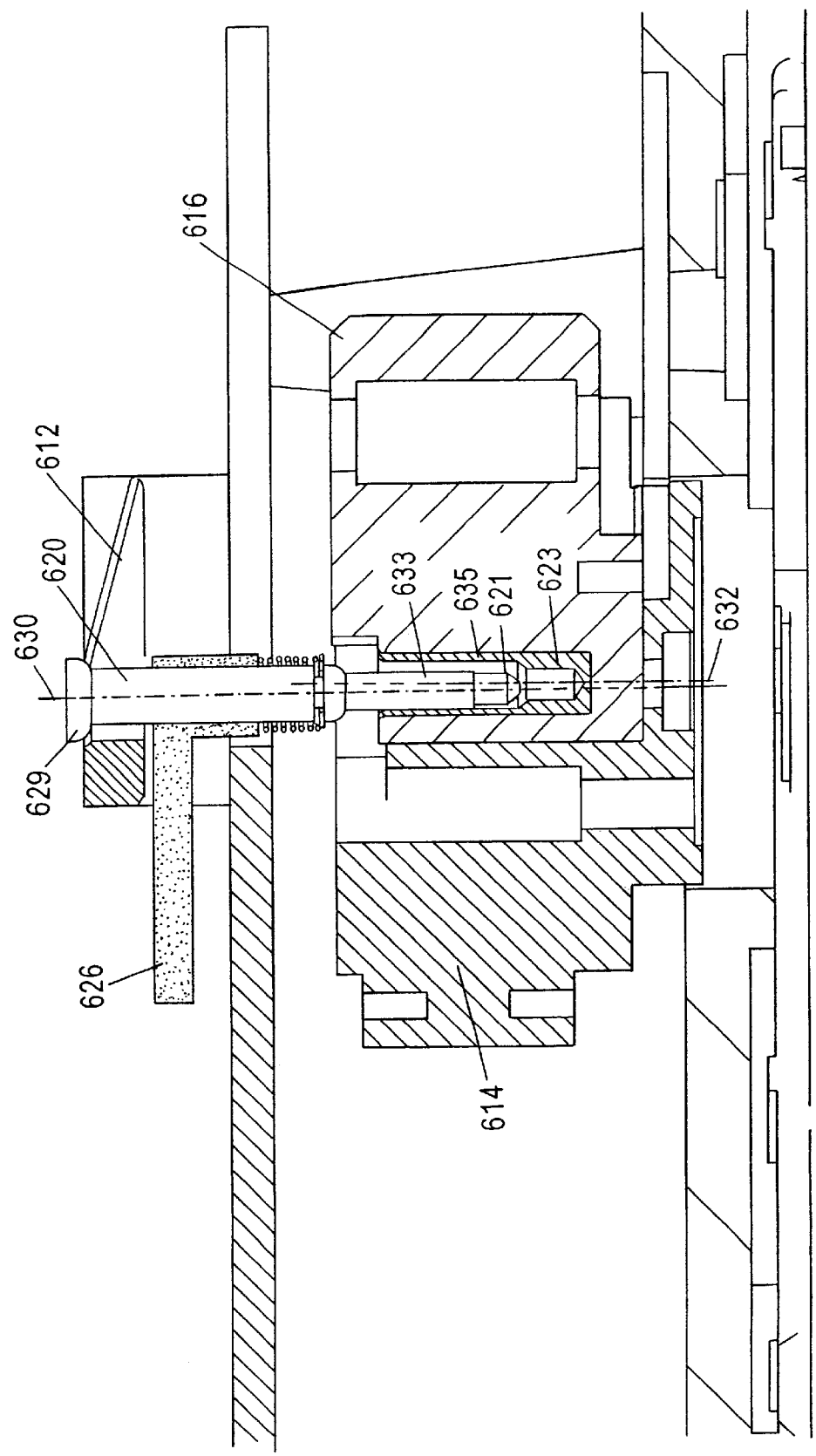
FIG. 8 is a side view of the hub filler completely lodged in the take-up reel.

FIG. 8 is a side view of the hub filler 616 in the take-up reel 614. The hub filler 616 is fully inserted in the take-up reel 614 due to the continued movement of the arrangement by the motor and linkage. In the illustrated embodiment, the axle 620 is lifted up by the ramp 612 and a main shaft portion 633, of larger diameter than small shaft 621, pushes the hub filler 616 completely into the take-up reel 614 by pushing against one side of the large bore 635. The small shaft 621 has been completely lifted out of the small bore 623 to de-couple the small shaft 621 from the small bore 623. This allows some freedom of movement of the axle 620 in the hub filler 616. The main shaft portion 633 is only able to push the hub filler 616 through contact with the large bore 635, when the small shaft 621 is not de-coupled from the small bore 623. At this point, the guide arm 626 has pushed the hub filler 616 to the extreme end of the channel in the take-up reel 614. The axle 620 is still in contact with the hub filler 616 and not de-coupled from the hub filler 616. The axis 630 of the axle 620 is not aligned with the axis 632 of the take-up reel 614. In certain embodiments of the invention, the take-up reel 614 will rotate several times while the main shaft portion 633 is still in contact with the large bore 635.

Figure 9:
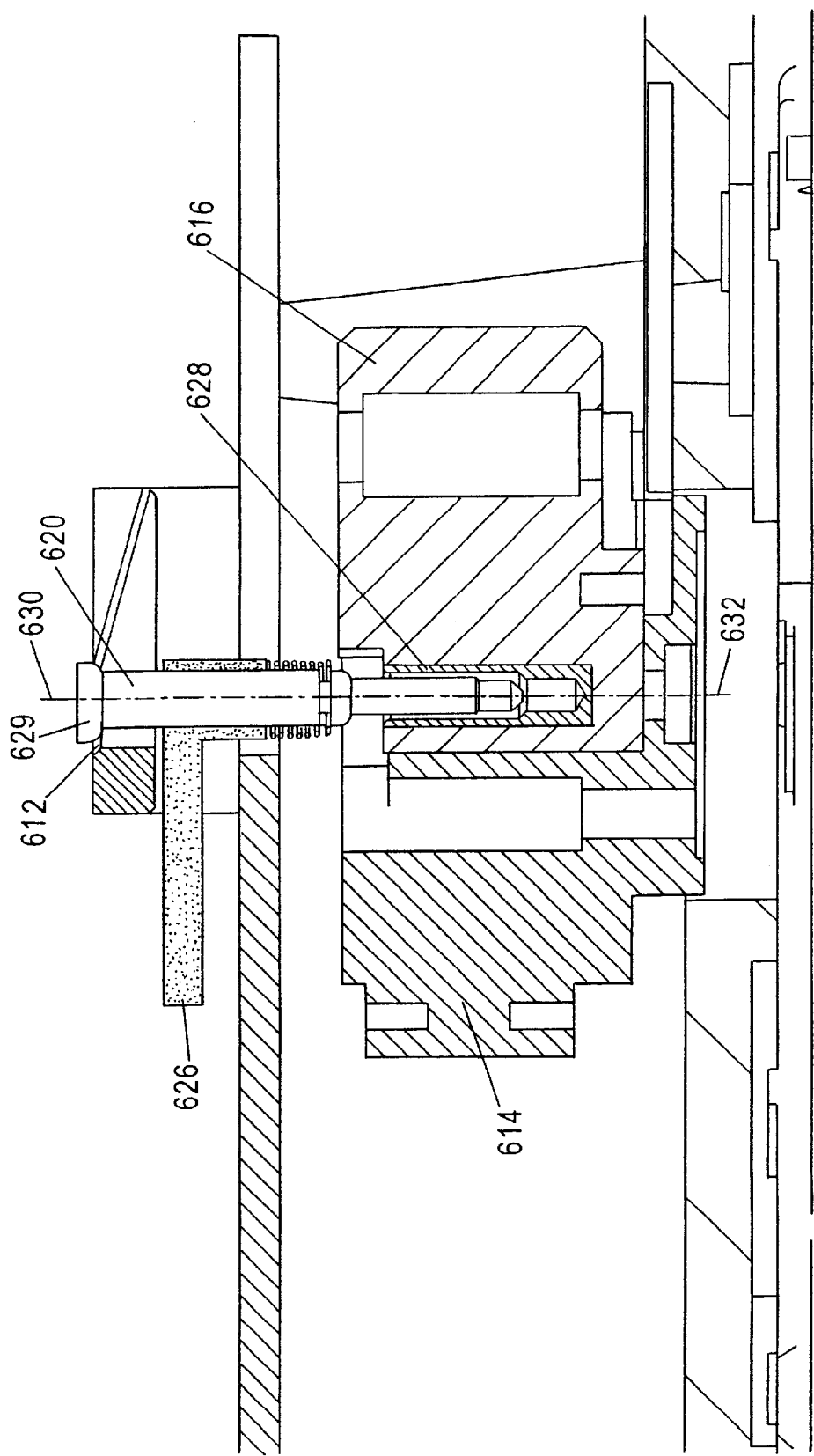
FIG. 9 is a side view of the hub filler in the take-up reel and decoupled from the guide arm.

FIG. 9 is a side view of the hub filler 616 in the take-up reel 614 when it is fully decoupled from the guide arm 626. The axle 620 is now centered in the sheath 628 such that the axis 630 of the axle 620 and the axis 632 of the take-up reel 614 are aligned. Since the guide arm 626 is fully decoupled from the hub filler 616, the take-up reel 614 is able to rotate freely around the axis 632, immune from any small misalignments between the axle axis 630 and the take-up reel axis 632. This relative immunity helps prevent small speed variations and wearing down of the bearings.

In certain embodiments of the invention, the guide arm 626 is driven by a motor (not shown) with an encoder. The motor has encoded positions for positioning of the guide arm 626 throughout the loading and unloading of the tape; such positioning can include attachment of the tape 613 at the cartridge 610, movement along the guide rail 624 into the take-up reel 614, the decoupling movements in the take-up reel 614, recoupling movements of the guide arm 626 with the hub filler 616, return of the tape to the cartridge, and detachment movements of the tape from the hub filler 616. Small misalignments due to the encoded motor position or other mechanical tolerations are immune in the take-up reel 614, as the axle 620 is de-coupled from the hub filler 616 during rotation of the take-up reel 614 during the reading and writing of the tape 613 in the tape drive.

Figure 10:
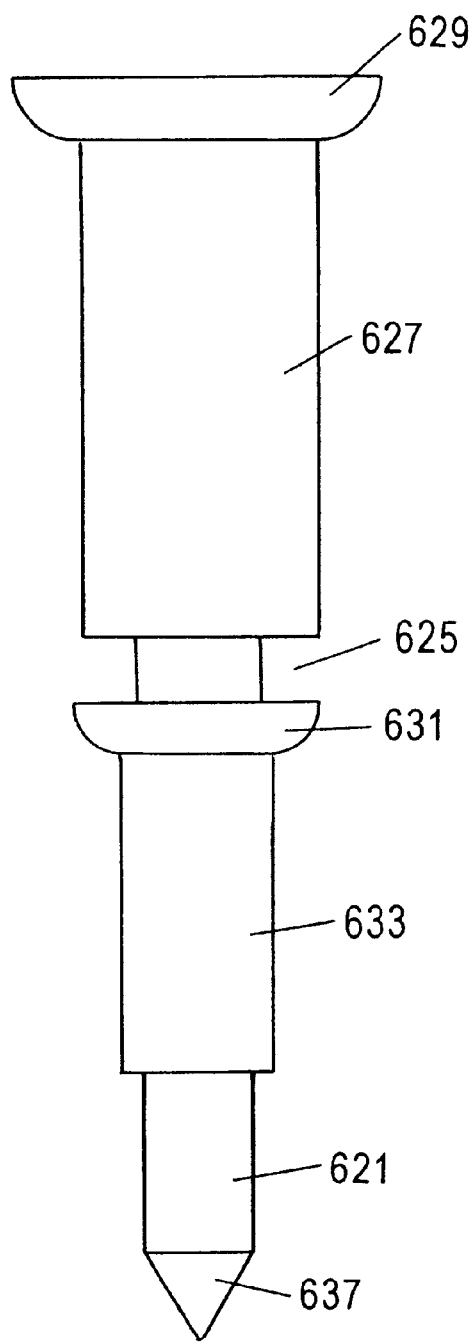
FIG. 10 is a side view of the axle.

FIG. 10 is a side view of the axle 620. The axle top section 629 is above the large shaft 627 which is above the notch 625 for the spring. The notch 625 for the spring is above the small spherical stop 631. The small spherical stop 631 is above the main shaft 633. The medium shaft 633 is above the small shaft 621. The small shaft 621 is above the axle point 637.

Figure 11:
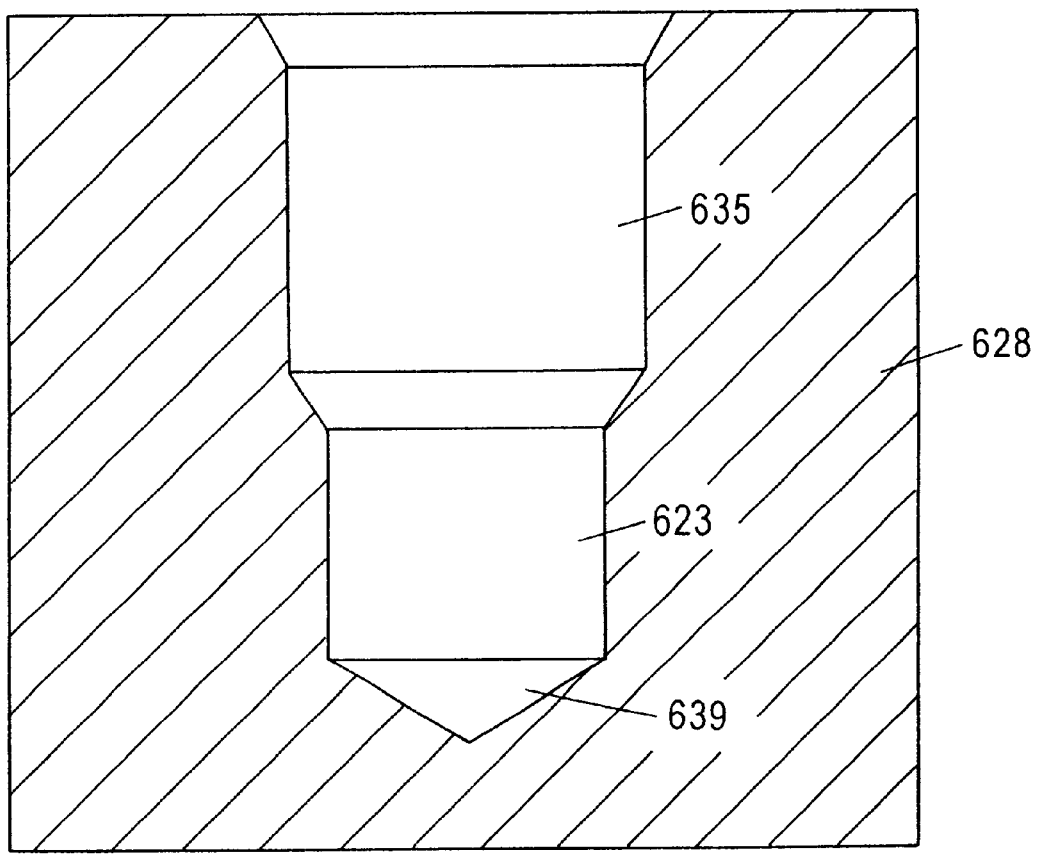
FIG. 11 is a side view of the shaft in the hub filler for receiving the axle.

FIG. 11 is a side view of the shaft 628 of the hub filler 616. The large bore 635 is above the small bore 623. The small bore 623 is above the axle's point receiver 639.

Figure 12:
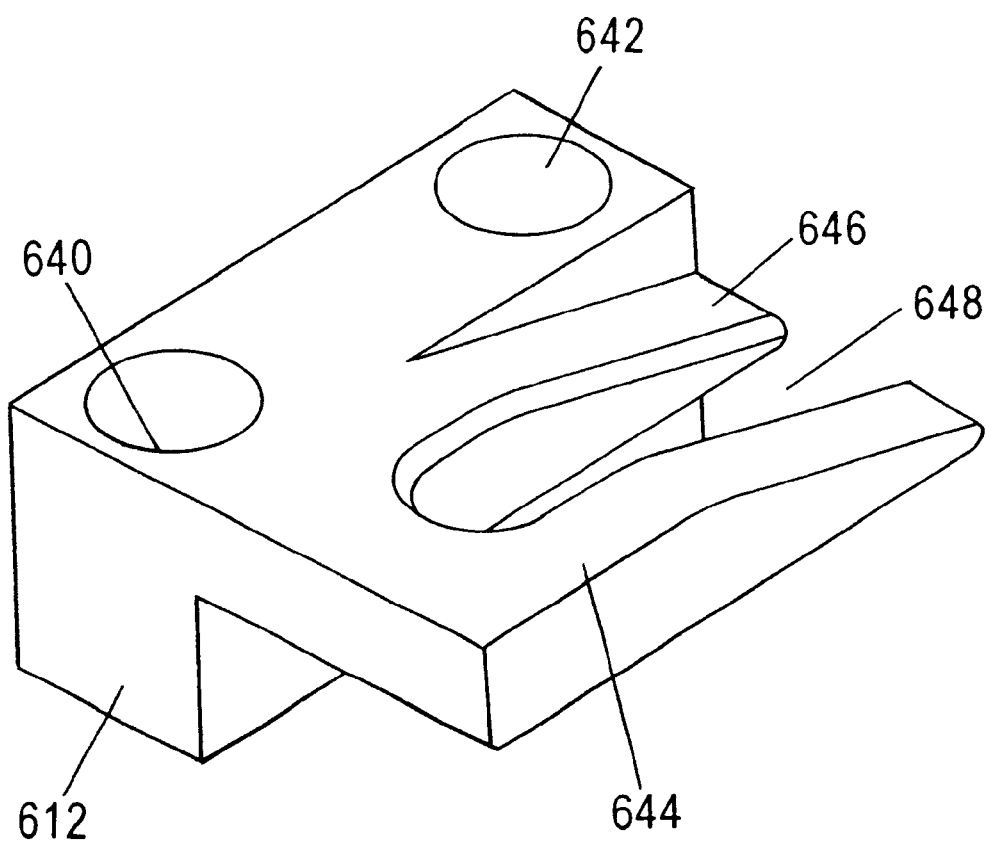
FIG. 12 is a view of the ramp.

FIG. 12 is a top perspective view of the ramp 612. The ramp 612 has a first bore 640 and a second bore 642 for attachment of the ramp 612 above the take-up reel 614. The ramp 612 has diagonal regions 646 and a plateau region 644. A channel 648 in the ramp 612 is disposed in the plateau region 644 and between the diagonal regions 646. As the axle 620 enters the channel 648 of the ramp 612, the top section 629 of the axle 620 is positioned between the diagonal regions 646 to catch on the ramp 612. The large shaft 635 travels inside the channel 648 as the axle 620 is lifted out of the hub filler by the ramp 612.

The present invention provides an improved method of loading a tape from a single reel tape cartridge into a take-up reel. This is accomplished, in part, by a guide arm being de-coupled from a hub filler as it enters a take-up reel. The de-coupling mitigates problems of conventional tape drive mechanisms that result from small misalignments of the axis of the hub filler axle with the axis of the take-up reel. The axle and drive arm are fully decoupled from the hub filler by the axle by being lifted out of the hub filler, allowing for the take-up reel to rotate freely during winding and unwinding of the tape without interference from the axle.

Although the present invention has been described and illustrated in detail, it is to be clearly understood that the same is by way of illustration and example only, and is not to be taken by way of limitation. The scope of the present invention being limited only by the terms of the appended claims.

What is claimed is:

1. A tape loading device comprising:
   a take-up reel; and
   means for loading the take-up reel with tape from a tape cartridge.

2. The tape loading device of claim 1, wherein the means for loading the take-up reel with tape from a tape cartridge comprises:
   a guide rail from the tape cartridge to an interior of the take-up reel;
   a hub filler attached to the guide rail;
   an opening in the take-up reel configured to receive the hub filler; and
   a guide arm coupled to the hub filler when the hub filler is between the tape cartridge and an edge of the take-up reel and decouplable from the hub filler after the hub filler is in the take-up reel.

3. The tape loading device of claim 2, further comprising a decoupling arrangement that interacts with the guide arm to decouple the guide arm from the hub filler.

4. The tape loading device of claim 2, further comprising:
   an axle coupled to the hub filler when the hub filler is between the tape cartridge and the edge of the take-up reel and decoupled from the hub filler when the hub filler is fully inserted in the take-up reel.

5. The tape loading device of claim 4, further comprising:
   a motor driving the guide arm, wherein the motor has an encoder to control the guide arm position.

6. The tape loading device of claim 5, wherein:
   the hub filler comprises a sheath for receiving the axle, wherein the sheath comprises a small bore and a large bore; and
   the axle comprises a small shaft that complements the shape of the small bore and a main shaft that complements the shape of the large bore.

7. The tape loading device of claim 6, wherein:
   the hub filler pivots on the axle when the axle is coupled to the hub filler.

8. An apparatus for loading a take-up reel with tape from a tape cartridge comprising:
   a hub filler for transporting an end of a tape from the tape cartridge to the take-up reel, wherein the hub filler travels along a guide from the tape cartridge into the take-up reel; and
   an axle for moving the hub filler into the guide, wherein the axle decouples from the hub filler after the hub filler is moved inside the take-up reel.

9. The apparatus of claim 8, wherein:
   the guide comprising a guide rail arranged to guide the hub filler during transport between the tape cartridge and the take-up reel; and the axle is coupled to the hub filler through a sheath in the center of the hub filler.

10. The apparatus of claim 9, further comprises:

a lifting arrangement proximate to the take-up reel configured to lift the axle from the sheath as the hub filler enters the take-up reel.

11. The apparatus of claim 10, wherein the lifting arrangement is an inclined surface against which the axle bears upon movement of the hub filler into the take-up reel, with further movement of the hub filler into the take-up reel causing the axle to move higher on the inclined surface to lift the axle from the sheath.

12. The apparatus of claim 11, wherein:

the sheath comprises a small bore and a large bore;

the axle comprises a small shaft, a main shaft, a large shaft, an axle top section, and a notch, all with a common axis;

the main shaft is located above the small shaft;

the notch is located above the main shaft;

the large shaft is located above the notch;

the axle top section is located at the end of the large shaft;

the shape of the small bore complements the shape of the small shaft; and the shape of the large bore complements the shape of the main shaft.

13. The apparatus of claim 12, wherein:

the lifting arrangement is a ramp with an opening formed through a middle of the ramp; and the opening has a width approximately the diameter of the large shaft and arranged to allow the axle to move through the ramp when the hub filler is in the take-up reel with axle top section moving on the inclined surface of the ramp when the hub filler is in the take-up reel.

14. The apparatus of claim 13, wherein:

the small shaft is free of contact with the small bore when the hub filler has completely entered the take-up reel.

15. A method for loading a take-up reel with tape comprising the steps of:

driving a hub filler into a take-up reel with a guide arm; and decoupling the hub filler from the guide arm after the hub filler has completely entered the take-up reel.

16. The method of claim 15, comprising the further steps of:

guiding the hub filler from a tape cartridge to the take-up reel on a guide rail; and driving the hub filler along the guide rail with a motor coupled to the guide arm.

17. The method of claim 16, wherein:

the guide arm comprises an axle that is coupled to the hub filler through a sheath in the hub filler, when the hub filler is not in the take-up reel; and the hub filler pivots on the axle.

18. The method of claim 17, comprising the further step of:

lifting the axle from the hub filler when the hub filler enters the take-up reel.

19. The method of claim 18, wherein:

the sheath comprises a small bore and a large bore;

the axle comprises a small shaft, a main shaft, a large shaft, an axle top section, and a notch, all sharing a common axis;

the main shaft is located above the small shaft;

the notch is located above the main shaft;

the large shaft is located above the notch;

the axle top section is located above the large shaft;

the shape of the small bore complements the shape of the small shaft; and the shape of the large bore complements the shape of the main shaft; and the axle is held into the sheath by a spring attached to the notch.

20. The method of claim 19, wherein:

the take-up reel comprises a ramp with an opening formed through the middle, the opening has a width approximately the diameter of the large shaft allowing the large shaft to move through the ramp when the hub filler is in the take-up reel; and the ramp is positioned for the axle top section to move along the top of the ramp when the hub filler is in the take-up reel, lifting the axle out of the hub filler.

21. The method of claim 20, further comprising the steps of:

lifting the axle out of the sheath such that the small shaft is completely removed from the small bore;

driving the hub filler to the center of the take-up reel with the medium shaft contacting the large bore;

rotating the take-up reel; and centering the axle above the axis of the sheath, using an encoded motor position.

\* \* \* \* \*